US011092668B2

(12) United States Patent
Wang et al.

(10) Patent No.: US 11,092,668 B2
(45) Date of Patent: Aug. 17, 2021

(54) TRAILER DETECTION SYSTEM AND METHOD

(71) Applicant: Aptiv Technologies Limited, St. Michael (BB)

(72) Inventors: Yu Wang, Troy, MI (US); Yang Wang, Novi, MI (US); Liang Ma, Rochester Hills, MI (US)

(73) Assignee: Aptiv Technologies Limited, St. Michael (BB)

( * ) Notice: Subject to any disclaimer, the term of this patent is extended or adjusted under 35 U.S.C. 154(b) by 331 days.

(21) Appl. No.: 16/270,199

(22) Filed: Feb. 7, 2019

(65) Prior Publication Data

US 2020/0256953 A1 Aug. 13, 2020

(51) Int. Cl.
*G01S 7/41* (2006.01)
*G01S 13/42* (2006.01)
(Continued)

(52) U.S. Cl.
CPC ............ *G01S 7/412* (2013.01); *G01S 13/426* (2013.01); *G01S 13/56* (2013.01); *G01S 13/588* (2013.01); *G01S 13/72* (2013.01); *G01S 13/878* (2013.01); *G01S 13/931* (2013.01); *G01S 2013/9315* (2020.01); *G01S 2013/93272* (2020.01); *G01S 2013/93275* (2020.01)

(58) Field of Classification Search
CPC ............... G01S 13/72; G01S 13/931; G01S 2013/9315; G01S 2013/93275; G01S 2013/93272; G01S 13/56; G01S 13/588
See application file for complete search history.

(56) References Cited

U.S. PATENT DOCUMENTS 5,361,072 A 11/1994 Barrick et al.
5,517,196 A 5/1996 Pakett et al.
(Continued)

FOREIGN PATENT DOCUMENTS

CN 1559842 1/2005
CN 101268383 9/2008
(Continued)

OTHER PUBLICATIONS

"Corrected Notice of Allowance", U.S. Appl. No. 16/154,848, dated Oct. 19, 2020, 2 pages.
(Continued)

*Primary Examiner* — Timothy A Brainard
(74) *Attorney, Agent, or Firm* — Colby Nipper PLLC

(57) ABSTRACT

A detection system includes a ranging sensor and a controller circuit. The ranging sensor is configured to detect range rates of objects proximate a host vehicle. The controller circuit is in communication with the ranging sensor. The controller circuit is configured to determine a search area extending from the host vehicle. The controller circuit is further configured to determine a first histogram comprising counts of occurrences of the range rates detected within the search area. The controller circuit is further configured to determine a second histogram comprising the counts of occurrences of a portion of the range rates detected within the search area. The controller circuit is further configured to determine that a trailer is being towed by the host vehicle based on the first histogram and the second histogram.

11 Claims, 8 Drawing Sheets

(51) Int. Cl.
*G01S 13/72* (2006.01)
*G01S 13/87* (2006.01)
*G01S 13/931* (2020.01)
*G01S 13/58* (2006.01)
*G01S 13/56* (2006.01)

(56) References Cited

U.S. PATENT DOCUMENTS

| | | |
|---|---|---|
| 6,680,689 B1 | 1/2004 | Zoratti |
| 6,933,837 B2 | 8/2005 | Gunderson et al. |
| 7,786,849 B2 | 8/2010 | Buckley |
| 7,904,222 B2 | 3/2011 | Lee et al. |
| 8,665,078 B2 | 3/2014 | Van Wiemeersch et al. |
| 9,211,889 B1 | 12/2015 | Hoetzer et al. |
| 9,229,102 B1* | 1/2016 | Wright ............... G01S 13/887 |
| 9,296,423 B2 | 3/2016 | Rupp et al. |
| 9,373,044 B2 | 6/2016 | Wallat et al. |
| 9,477,894 B1 | 10/2016 | Reed et al. |
| 9,566,911 B2 | 2/2017 | Greenwood et al. |
| 9,594,155 B2 | 3/2017 | Cashier et al. |
| 9,796,228 B2 | 10/2017 | Hu et al. |
| 9,804,022 B2 | 10/2017 | Kyrtsos et al. |
| 9,910,151 B2 | 3/2018 | Cashier |
| 9,937,953 B2 | 4/2018 | Lavoie et al. |
| 9,975,480 B2 | 5/2018 | Lai et al. |
| 10,207,643 B2 | 2/2019 | Prasad et al. |
| 10,276,049 B2 | 4/2019 | Prasad et al. |
| 10,286,916 B2 | 5/2019 | Prasad et al. |
| 10,351,146 B2 | 7/2019 | Prasad et al. |
| 10,393,862 B2 | 8/2019 | Cashler et al. |
| 10,481,255 B2 | 11/2019 | Prasad et al. |
| 10,838,054 B2 | 11/2020 | Wang et al. |
| 10,955,540 B2 | 3/2021 | Wang et al. |
| 2008/0169938 A1 | 7/2008 | Madau |
| 2008/0186204 A1 | 8/2008 | Buckley |
| 2009/0005932 A1 | 1/2009 | Lee et al. |
| 2010/0109938 A1 | 5/2010 | Oswald et al. |
| 2011/0140872 A1 | 6/2011 | McClure |
| 2011/0257860 A1 | 10/2011 | Getman et al. |
| 2012/0041659 A1 | 2/2012 | Greene |
| 2012/0169523 A1 | 7/2012 | Lee et al. |
| 2013/0027195 A1 | 1/2013 | Van Wiemeersch et al. |
| 2013/0169425 A1 | 7/2013 | Victor et al. |
| 2013/0176161 A1 | 7/2013 | Derham et al. |
| 2013/0222592 A1 | 8/2013 | Gieseke |
| 2013/0226390 A1 | 8/2013 | Luo et al. |
| 2013/0251194 A1* | 9/2013 | Schamp ............... G06T 7/11 382/103 |
| 2014/0085472 A1 | 3/2014 | Lu et al. |
| 2014/0160276 A1 | 6/2014 | Pliefke et al. |
| 2014/0160279 A1 | 6/2014 | Pliefke et al. |
| 2014/0176716 A1 | 6/2014 | Wallat et al. |
| 2014/0218522 A1 | 8/2014 | Lavoie et al. |
| 2014/0222288 A1 | 8/2014 | Lavoie et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0303849 A1 | 10/2014 | Hafner et al. |
| 2015/0120141 A1 | 4/2015 | Lavoie et al. |
| 2016/0041258 A1* | 2/2016 | Cashler ............... G01S 7/521 342/70 |
| 2016/0084943 A1* | 3/2016 | Arage ............... G01S 13/42 342/102 |
| 2016/0098604 A1 | 4/2016 | Min |
| 2016/0101811 A1 | 4/2016 | Kyrtsos et al. |
| 2016/0153778 A1 | 6/2016 | Singh et al. |
| 2016/0167651 A1 | 6/2016 | Schwindt et al. |
| 2016/0203374 A1* | 7/2016 | Zeng ............... G06T 7/75 382/104 |
| 2016/0209211 A1 | 7/2016 | Song et al. |
| 2016/0252610 A1 | 9/2016 | Smith et al. |
| 2016/0297361 A1 | 10/2016 | Drazan et al. |
| 2017/0001566 A1* | 1/2017 | Lu ............... B60R 1/00 |
| 2017/0080928 A1 | 3/2017 | Wasiek et al. |
| 2017/0177949 A1* | 6/2017 | Hu ............... G06T 7/12 |
| 2017/0217368 A1 | 8/2017 | Lewis et al. |
| 2017/0242443 A1 | 8/2017 | Schuh et al. |
| 2017/0305436 A1 | 10/2017 | Maskell et al. |
| 2017/0363727 A1 | 12/2017 | Prasad et al. |
| 2017/0363728 A1 | 12/2017 | Prasad et al. |
| 2018/0011172 A1* | 1/2018 | Cashier ............... G01S 13/72 |
| 2018/0025499 A1 | 1/2018 | Strand et al. |
| 2018/0045823 A1 | 2/2018 | Prasad et al. |
| 2018/0061239 A1 | 3/2018 | Prasad et al. |
| 2018/0068447 A1 | 3/2018 | Prasad et al. |
| 2018/0068566 A1 | 3/2018 | Prasad et al. |
| 2018/0203106 A1* | 7/2018 | Di ............... G01S 7/411 |
| 2019/0033442 A1 | 1/2019 | Millar et al. |
| 2019/0086204 A1 | 3/2019 | Critchley et al. |
| 2019/0170867 A1 | 6/2019 | Wang et al. |
| 2019/0228258 A1* | 7/2019 | Bell ............... G06T 7/70 |
| 2019/0232964 A1 | 8/2019 | Lindholm |
| 2019/0308473 A1 | 10/2019 | Yu et al. |
| 2019/0335100 A1 | 10/2019 | Chen et al. |
| 2019/0347498 A1 | 11/2019 | Herman et al. |
| 2020/0079165 A1* | 3/2020 | Niewiadomski ... G06K 9/00791 |
| 2020/0081117 A1* | 3/2020 | Flores Tapia ........... G01S 7/415 |
| 2020/0110163 A1 | 4/2020 | Wang et al. |
| 2021/0011145 A1 | 1/2021 | Wang et al. |
| 2021/0141075 A1 | 5/2021 | Wang et al. |

FOREIGN PATENT DOCUMENTS

| | | |
|---|---|---|
| CN | 102609953 | 7/2012 |
| CN | 203047062 | 7/2013 |
| CN | 104890671 | 9/2015 |
| CN | 205044655 | 2/2016 |
| CN | 105501114 | 4/2016 |
| DE | 10312548 | 5/2004 |
| DE | 10325192 | 1/2005 |
| DE | 1020004059596 | 6/2006 |
| DE | 102005019550 | 11/2006 |
| DE | 102005042729 | 3/2007 |
| DE | 102006028625 | 10/2007 |
| DE | 102009007990 | 8/2012 |
| DE | 102014107917 | 9/2015 |
| DE | 102016200642 | 7/2017 |
| EP | 2045155 | 4/2009 |
| EP | 2551132 | 1/2013 |
| EP | 2942766 | 11/2015 |
| EP | 2942766 A1 | 11/2015 |
| EP | 2983006 A1 | 2/2016 |
| EP | 3021140 | 5/2016 |
| EP | 3031687 | 6/2016 |
| EP | 3267222 | 1/2018 |
| EP | 3291205 | 3/2018 |
| GB | 2447672 | 9/2008 |
| GB | 2505666 | 3/2014 |
| GB | 2518857 | 4/2015 |
| JP | H09267762 | 10/1997 |
| JP | 2002068032 | 3/2002 |
| WO | 2006114206 | 11/2006 |
| WO | 2007028433 | 3/2007 |
| WO | 2016015938 | 2/2016 |

OTHER PUBLICATIONS

"Non-Final Office Action", U.S. Appl. No. 17/037,307, dated Oct. 23, 2020, 7 pages.
"Notice of Allowance", U.S. Appl. No. 15/840,321, dated Nov. 19, 2020, 8 pages.
U.S. Appl. No. 15/840,321, Detection System, filed Dec. 13, 2017, Wang et al.
Prasad, et al., "Trailer Lane Departure Warning and Sway Alert", U.S. Appl. No. 15/259,126, 16 pages.
"Detection System", U.S. Appl. No. 62/593,418, filed Dec. 1, 2017, 56 pages.
"European Search Report", EP Application No. 19199564, dated Feb. 20, 2020, 2 pages.
"Notice of Allowance", U.S. Appl. No. 16/154,848, dated Jul. 1, 2020, 9 pages.
"Advisory Action", U.S. Appl. No. 15/232,577, dated Feb. 6, 2019, 3 pages.

(56) References Cited

OTHER PUBLICATIONS

"Advisory Action", U.S. Appl. No. 15/204,071, dated Apr. 10, 2019, 3 pages.
"Advisory Action", U.S. Appl. No. 15/250,072, dated Sep. 11, 2018, 3 pages.
"Advisory Action", U.S. Appl. No. 15/257,062, dated Sep. 18, 2018, 3 pages.
"Corrected Notice of Allowability", U.S. Appl. No. 15/186,602, dated May 3, 2019, 4 pages.
"Detection System", U.S. Appl. No. 15/840,321, filed Dec. 13, 2017, 40 pages.
"European Search Report", EP Application No. 18208733, dated Apr. 22, 2019, 2 pages.
"European Search Report", EP Application No. 18208733, dated Sep. 6, 2019, 2 pages.
"Extended European Search Report", EP Application No. 17184001.0, dated Jan. 12, 2018, 8 pages.
"Extended European Search Report", EP Application No. 17186999.3, dated Jan. 17, 2018, 7 pages.
"Extended European Search Report", EP Application No. 17187300.3, dated Jan. 17, 2018, 7 pages.
"Extended European Search Report", EP Application No. 17188610.4, dated Feb. 13, 2018, 8 pages.
"Extended European Search Report", EP Application No. 17174836.1, dated Nov. 22, 2017, 10 pages.
"Extended European Search Report", EP Application No. 17174842.9, dated Nov. 23, 2017, 10 pages.
"Extended European Search Report", EP Application No. 17176204.0, dated Dec. 8, 2017, 7 pages.
"Final Office Action", U.S. Appl. No. 15/186,602, dated Jan. 14, 2019, 10 pages.
"Final Office Action", U.S. Appl. No. 15/259,126, dated Jun. 1, 2018, 14 pages.
"Final Office Action", U.S. Appl. No. 15/257,062, dated Jul. 13, 2018, 7 pages.
"Final Office Action", U.S. Appl. No. 15/250,072, dated Jul. 16, 2018, 9 pages.
"Final Office Action", U.S. Appl. No. 15/232,577, dated Nov. 26, 2018, 8 pages.
"Final Office Action", U.S. Appl. No. 15/204,071, dated Dec. 17, 2018, 7 pages.
"Foreign Office Action", CN Application No. 201710542068.6, dated Mar. 9, 2020, 12 pages.
"Foreign Office Action", CN Application No. 201710464962.6, dated Mar. 10, 2020, 18 pages.
"Foreign Office Action", EP Application No. 17187300.3, dated May 14, 2020, 4 pages.
"Foreign Office Action", CN Application No. 201710806769.6, dated Jun. 9, 2020, 17 pages.
"Foreign Office Action", CN Application No. 201710464625.7, dated Jun. 17, 2020, 9 pages.
"Foreign Office Action", CN Application No. 201710464625.7, dated Jul. 11, 2019, 12 pages.
"Foreign Office Action", CN Application No. 201710806769.6, dated Dec. 4, 2019, 20 pages.
"Non-Final Office Action", U.S. Appl. No. 15/259,126, dated Jan. 18, 2018, 12 pages.
"Non-Final Office Action", U.S. Appl. No. 15/257,062, dated Feb. 7, 2018, 7 pages.
"Non-Final Office Action", U.S. Appl. No. 15/250,072, dated Mar. 27, 2018, 10 pages.
"Non-Final Office Action", U.S. Appl. No. 15/232,577, dated Mar. 28, 2019, 10 pages.
"Non-Final Office Action", U.S. Appl. No. 15/840,321, dated Apr. 28, 2020, 9 pages.
"Non-Final Office Action", U.S. Appl. No. 15/186,601, dated May 29, 2018, 7 pages.
"Non-Final Office Action", U.S. Appl. No. 15/232,577, dated Jun. 8, 2018, 7 pages.
"Non-Final Office Action", U.S. Appl. No. 15/186,602, dated Jul. 19, 2018, 10 pages.
"Non-Final Office Action", U.S. Appl. No. 15/204,071, dated Jul. 19, 2018, 6 pages.
"Notice of Allowance", U.S. Appl. No. 15/250,072, dated Jan. 2, 2019, 5 pages.
"Notice of Allowance", U.S. Appl. No. 15/186,601, dated Jan. 18, 2019, 7 pages.
"Notice of Allowance", U.S. Appl. No. 15/186,602, dated Mar. 20, 2019, 7 pages.
"Notice of Allowance", U.S. Appl. No. 15/204,071, dated May 21, 2019, 8 pages.
"Notice of Allowance", U.S. Appl. No. 15/232,577, dated Jul. 17, 2019, 7 pages.
"Notice of Allowance", U.S. Appl. No. 15/840,321, dated Sep. 10, 2020, 10 Pages.
"Restriction Requirement", U.S. Appl. No. 15/840,321, dated Jan. 31, 2020, 6 pages.
Cashler, et al., "Trailer Estimation with Elevation Enhanced Sensing", U.S. Appl. No. 15/204,071, filed Jul. 7, 2016, 14 pages.
Prasad, et al., "Camera Based Trailer Detection and Tracking", U.S. Appl. No. 15/257,062, filed Sep. 6, 2017, 10 pages.
Prasad, et al., "Camera Based Trailer Identification and Blind Zone Adjustment", U.S. Appl. No. 15/250,072, filed Aug. 29, 2016, 16 pages.
Prasad, et al., "Trailer Dimension with Two Dimensional Radar and Camera", U.S. Appl. No. 15/232,577, filed Aug. 9, 2016, 12 pages.
Prasad, et al., "Trailer Estimation and Blind Spot Information System Performance Improvement", U.S. Appl. No. 15/186,601, filed Jun. 20, 2016, 18 pages.
Prasad, et al., "Trailer Estimation Improvement", U.S. Appl. No. 15/186,602, filed Jun. 20, 2016, 21 pages.
European Search Report for Application No. 20152210, European Patent Office, dated Mar. 23, 2020.
"Corrected Notice of Allowane", U.S. Appl. No. 15/840,321, dated Feb. 16, 2021, 3 pages.
"Final Office Action", U.S. Appl. No. 17/037,307, dated Mar. 4, 2021, 7 pages.
"Foreign Office Action", EP Application No. 17184001.0, dated May 3, 2021, 5 pages.
"Notice of Allowance", U.S. Appl. No. 17/037,307, dated Apr. 19, 2021, 7 pages.
"Corrected Notice of Allowance", U.S. Appl. No. 17/037,307, dated Jul. 6, 2021, 2 pages.
"Extended European Search Report", EP Application No. 21151400.5, dated Jun. 18, 2021, 12 pages.
Homm, et al., "Efficient Occupancy Grid Computation on the GPU with Lidar and Radar for Road Boundary Detection", Jun. 2010, 8 pages.

\* cited by examiner

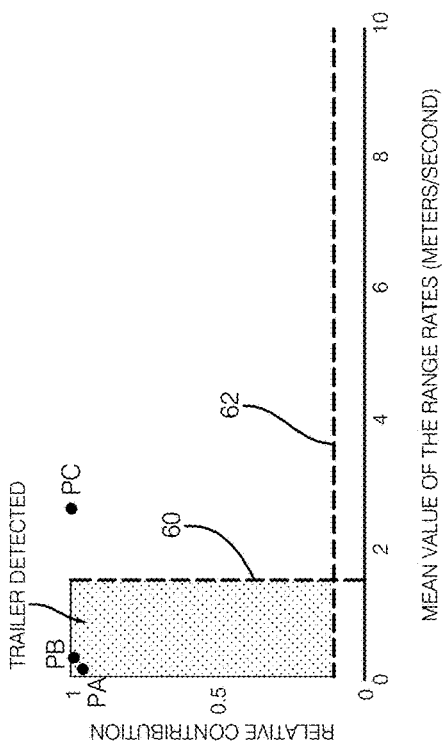
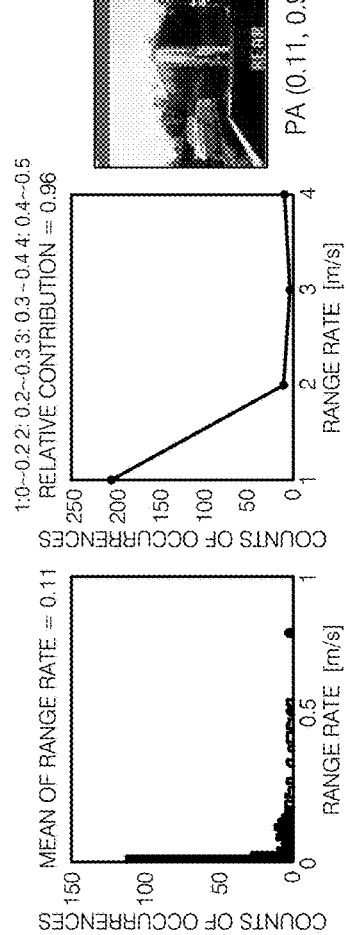
FIG. 7A
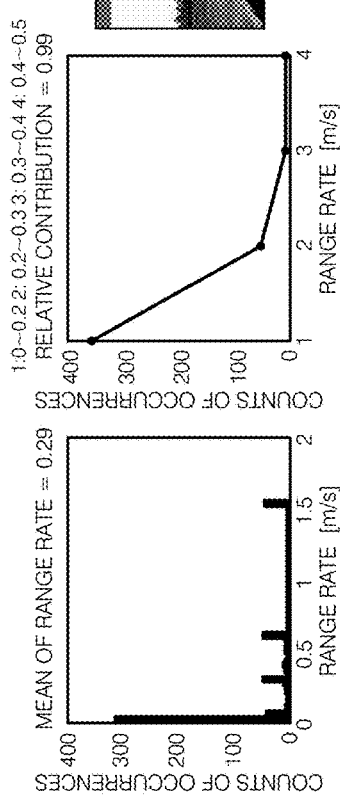
FIG. 7B
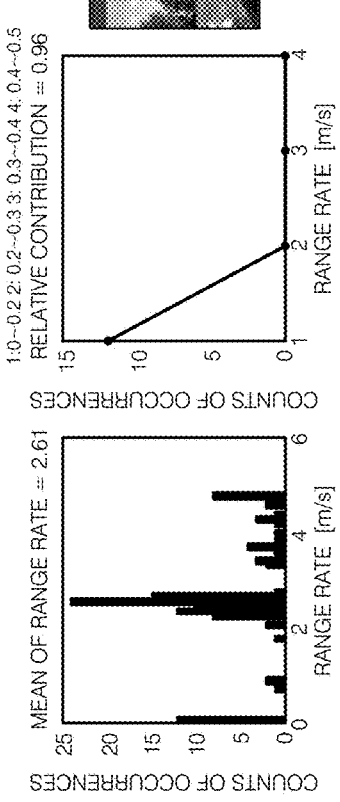
FIG. 7C
FIG. 7D

TRAILER DETECTION SYSTEM AND METHOD

TECHNICAL FIELD OF INVENTION

This disclosure generally relates to a detection system, and more particularly relates to a detection system that determines a presence of a trailer being towed by a host vehicle.

BRIEF DESCRIPTION OF DRAWINGS

The present invention will now be described, by way of example with reference to the accompanying drawings, in which:

FIG. 7A illustrates the first histogram and the second histogram for a trailer being towed by a host vehicle accordance with one embodiment;

FIG. 7B illustrates the first histogram and the second histogram for another trailer being towed by the host vehicle accordance with one embodiment;

FIG. 7C illustrates the first histogram and the second histogram for a host vehicle with no trailer being towed accordance with one embodiment;

FIG. 7D is a plot of data from FIGS. 7A-7C; and

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
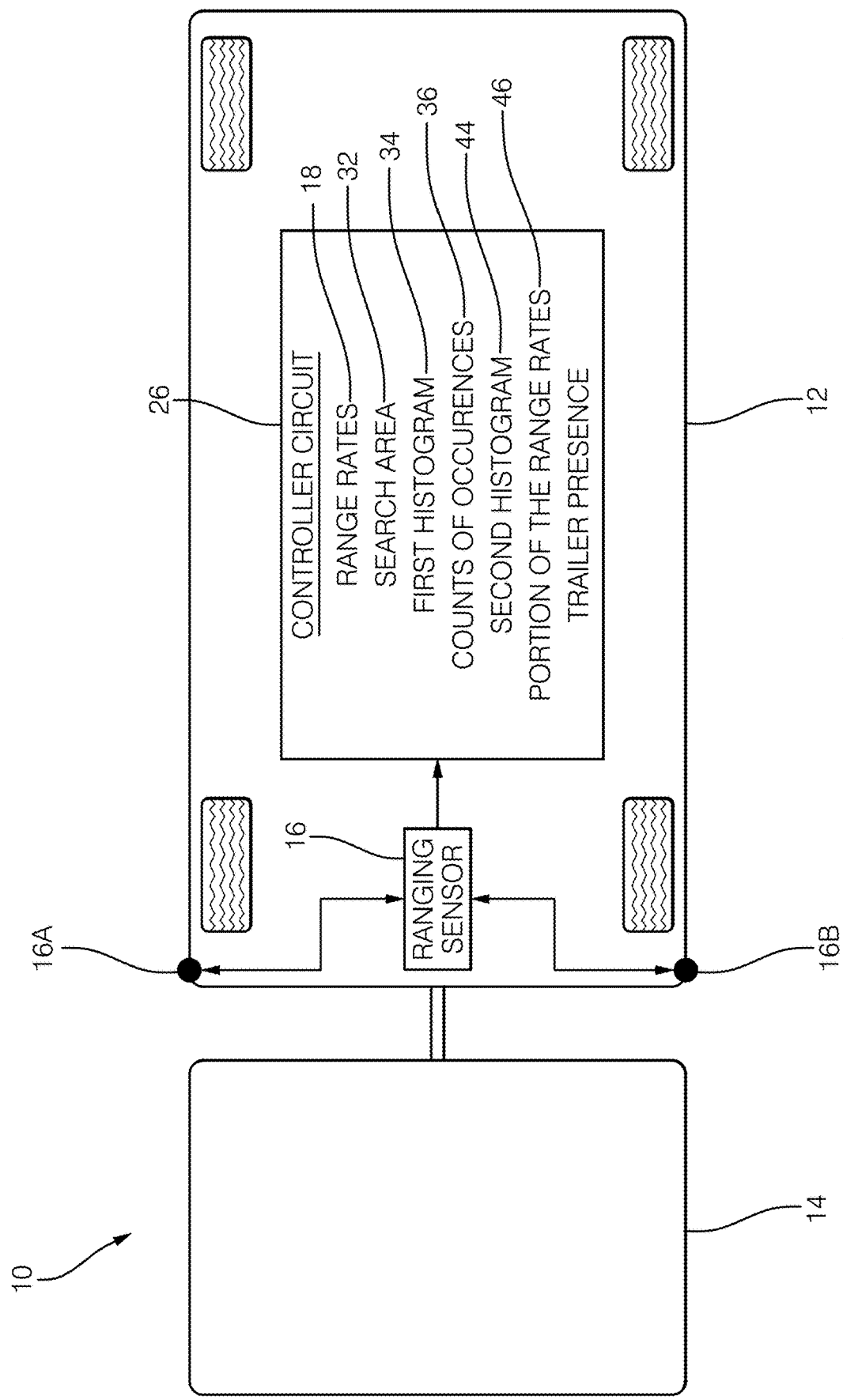
FIG. 1 is an illustration of a detection system in accordance with one embodiment.

FIG. 1 illustrates an example of a detection system 10, hereafter referred to as the system 10, installed on a host vehicle 12 towing a trailer 14. As will be described in more detail below, the system 10 may provide various improvements over other detection systems. For example, system 10 may determine a presence of the trailer 14 towed by the host vehicle 12 at relatively low host vehicle 12 speeds (e.g., less than about 0.5 m/s) and in a relatively short amount of time (e.g., less than about 10 seconds). As another example, system 10 may determine the presence of a trailer using of only raw detection data from a ranging sensor 16. According to this example, system 10 may process raw detection data, thereby reducing an implementation complexity and/or reduce an amount of processing power, memory, or power consumption needed to perform trailer detecting. In some such examples, by using raw detection data, system 10 may not use a tracking algorithm to process the raw detection data in order to determine the presence of the trailer 14.

Figure 2:
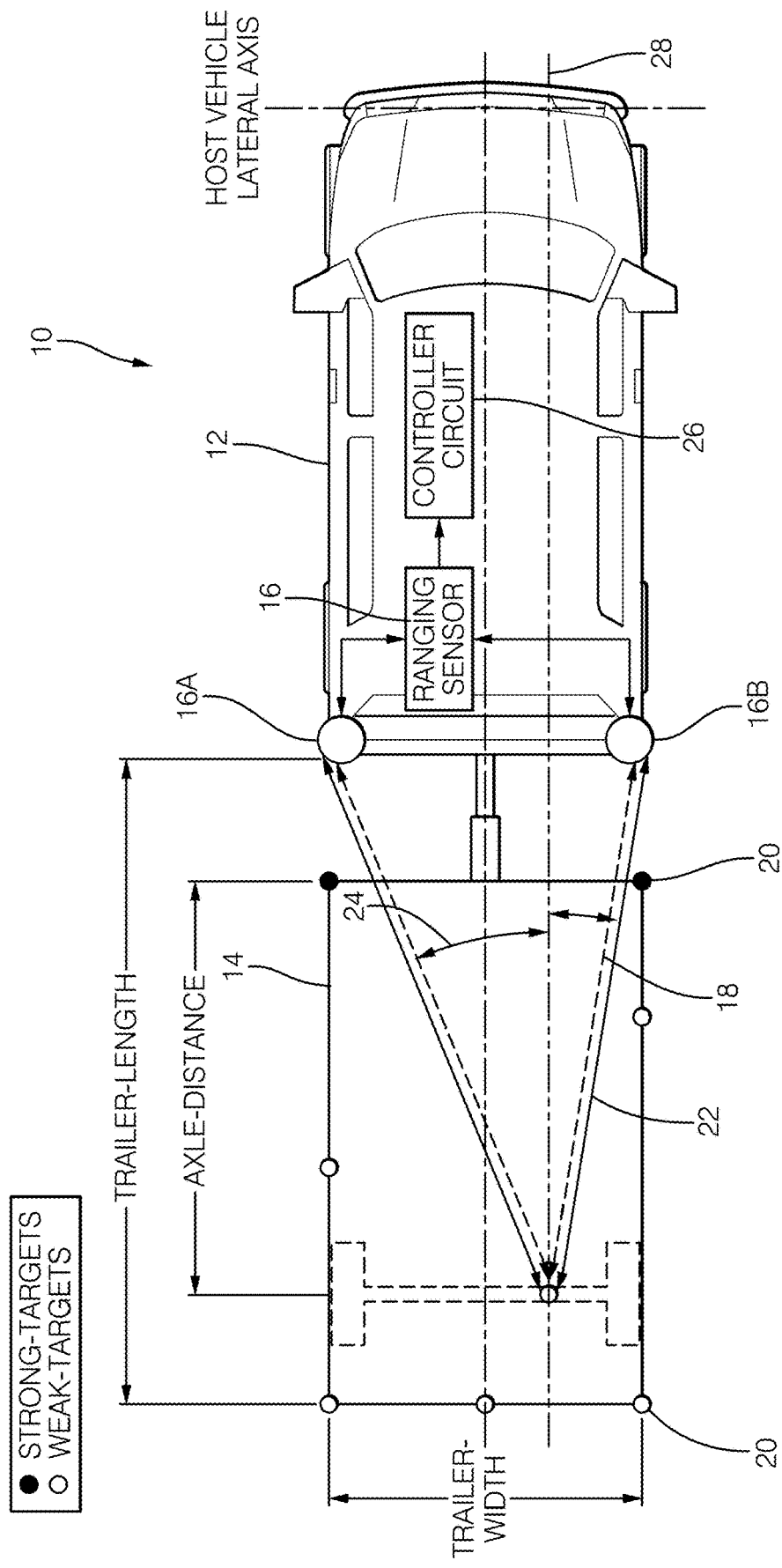
FIG. 2 is an illustration of the detection system of FIG. 1 in accordance with one embodiment.

The system 10 includes the ranging sensor 16 configured to detect range rates 18 of objects 20 proximate the host vehicle 12. The range rate 18 is defined as a time rate of change of a range 22 (i.e. a distance) between two objects 20. In the example illustrated in FIG. 1, the ranging sensor 16 is a radar sensor that includes a left sensor 16A and a right sensor 16B. Radar is a technology that uses radio waves to obtain data about nearby physical objects 20. A radar system produces radar data as output. For example, radar data are one or more radio frequency electromagnetic signals that are used to construct a representation of an environment around the host vehicle 12. The radar sensor detects a radar signal (not specifically shown) that is reflected by features of the trailer 14 towed by the host vehicle 12, as illustrated in FIG. 2. Typical radar systems on vehicles are capable of only determining the range 22 and azimuth angle 24 to the target so may be referred to as a two dimensional (2D) radar system. Other radar systems are capable of determining an elevation angle to the target so may be referred to as a three dimensional (3D) radar system. In the examples illustrated herein, the radar sensor is a 2D radar sensor. A radar sensor system with a similarly configured radar sensor is available from Aptiv of Troy, Mich., USA and marketed as an Electronically Scanning Radar (ESR) or a Rear Side Detection System (RSDS). It is contemplated that the teachings presented herein are applicable to radar systems with one or more sensor devices. It is also contemplated that the teachings presented herein are applicable to both 2D radar systems and 3D radar systems with one or more sensor devices, i.e. multiple instances of the radar sensor. The radar sensor is generally configured to detect the radar signal that may include data indicative of the detected target present on the trailer 14. As used herein, the detected target present on the trailer 14 may be a feature of the trailer 14 that is detected by the radar sensor and processed and/or tracked by a controller circuit 26, as will be described in more detail below. The signal characteristics may include or be indicative of, but are not limited to, the range 22 to the detected target from the host vehicle 12, the azimuth angle 24 to the detected target relative to a host vehicle longitudinal axis 28, an amplitude (not shown) of the radar signal, and a relative velocity of closure relative to the detected target (range rate 18). A target is generally detected because the radar signal from the detected target has sufficient signal strength to meet some predetermined threshold. That is, there may be targets that reflect the radar signal, but the strength of the radar signal is insufficient to be characterized as one of the detected targets. Data that corresponds to a strong target will generally be from consistent, non-intermittent signals. However, data that corresponds to a weak target may be intermittent or have some substantial variability due to a low signal to noise ratio. When the trailer 14 is being towed, there will generally be some consistent reflected signals created from strong targets such as the front of the trailer 14 or other highly reflective objects 20 such as wheel wells or fenders of the trailer 14, and some intermittent reflected signals from weak targets such as the back bumper of the trailer 14 or other vehicles (not shown) such as a motorcycle for example. Reflected signals from the weak targets may be, for example, a multi-path reflection from under the trailer 14 as the radar signal bounces between the trailer 14 and the ground, or by multi-path reflections traveling through a grated open trailer 14 or cross frame members of the frame of the trailer 14. Data from the reflected signals of detected targets that exist above and below the horizontal plane of the radar sensor are collapsed onto a 2D grid and may result in a determination of the trailer length and the trailer width that is greater than the actual value. This is due to the nature of the 2D radar sensor's inability to interpret the 3D radar signal's elevation angle (not shown).

The system 10 includes the controller circuit 26 in communication with the ranging sensor 16. The ranging sensor 16 may be hardwired to the controller circuit 26 through the host vehicle's 12 electrical system (not shown), or may communicate through a wireless network (not shown). The controller circuit 26 may include a processor (not shown) such as a microprocessor or other control circuitry such as analog and/or digital control circuitry including one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The controller circuit 26 may also combine custom hard-wired logic, ASICs, or FPGAs with custom programming to accomplish the techniques. The controller circuit 26 includes a memory 30, including non-volatile memory, such as electrically erasable programmable read-only memory (EEPROM) for storing one or more routines, thresholds, and captured data. The EEPROM stores data and allows individual bytes to be erased and reprogrammed by applying special programming signals. The one or more routines may be executed by the processor to perform steps for detecting the objects 20 based on signals received by the controller circuit 26 from the ranging sensor 16 as described herein.

Figure 3:
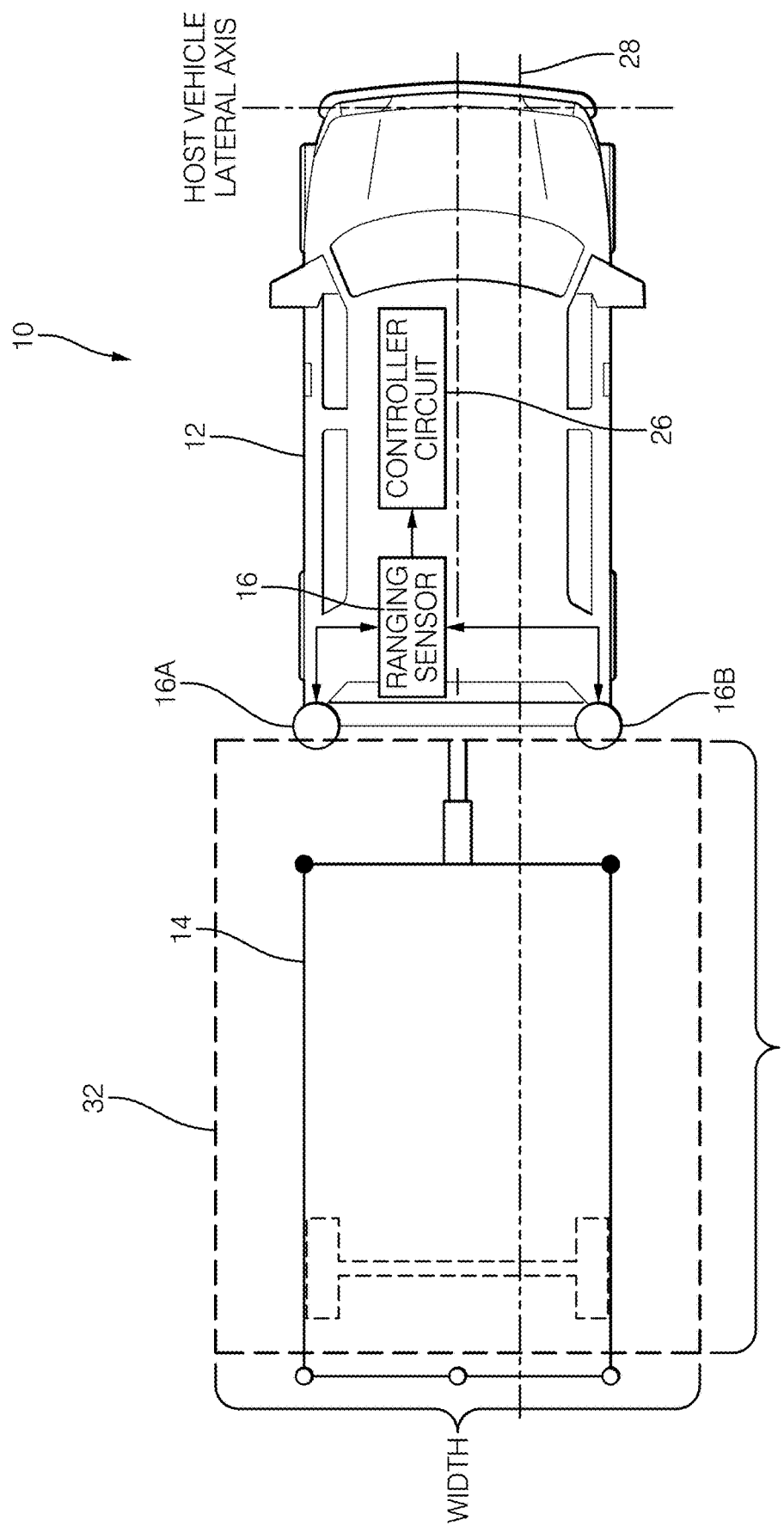
FIG. 3 is an illustration of the detection system of FIG. 2 in accordance with one embodiment.

FIG. 3 illustrates the host vehicle 12 equipped with the system 10 towing the trailer 14. The controller circuit 26 is configured to determine a search area 32 extending from a rear end of the host vehicle 12. The search area 32 may be selected to correspond to an expected size of the trailer 14. For example, it may extend along the host vehicle longitudinal axis 28 for a length of about 6.6 meters, and for a width of about 3 meters.

Figure 4:
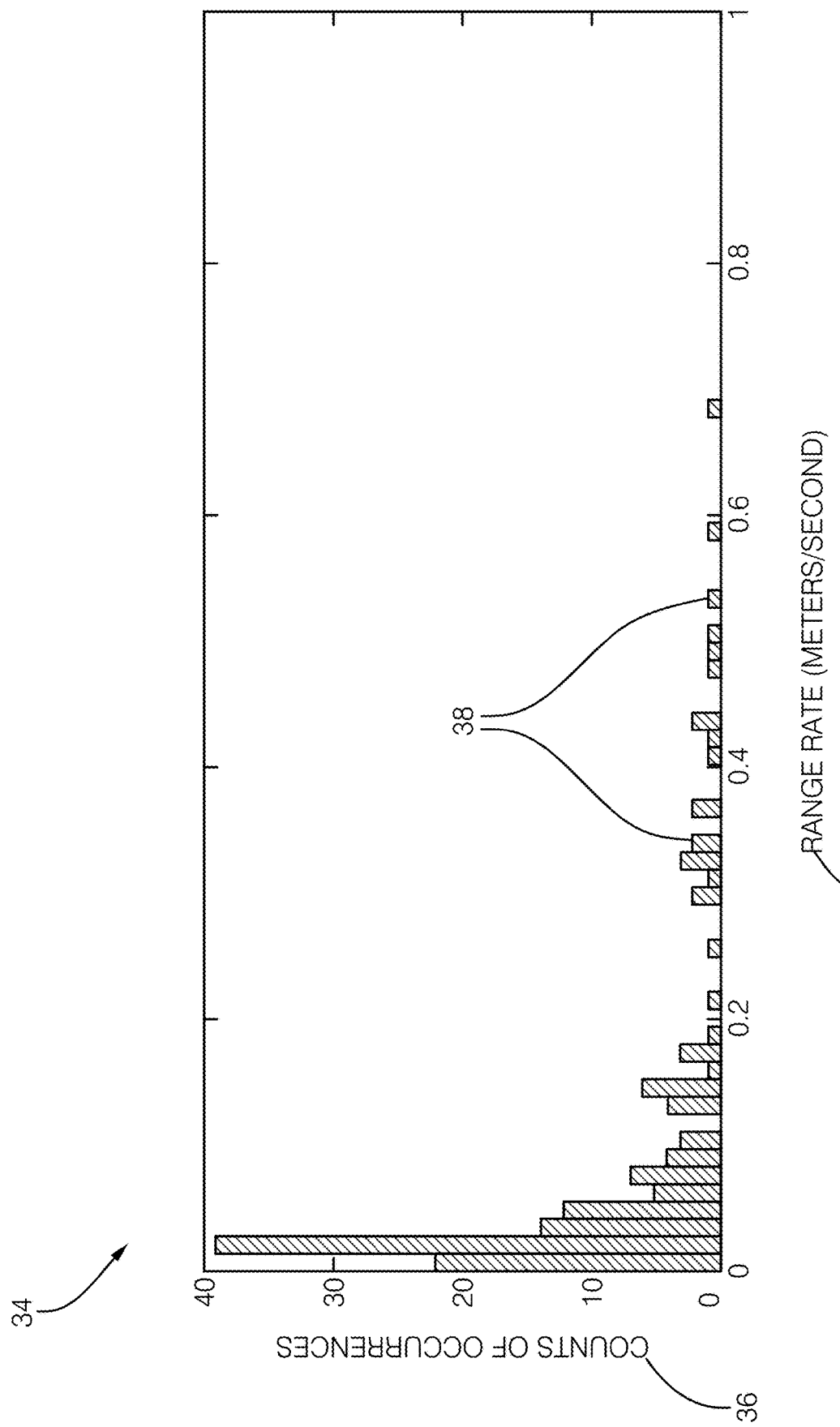
FIG. 4 is an illustration of a first histogram in accordance with one embodiment.

The controller circuit 26 is further configured to determine a first histogram 34 representing counts of occurrences 36 of the range rates 18 detected within the search area 32, as illustrated in FIG. 4. The first histogram 34 has a Y-axis of the counts of occurrences 36 of the range rates 18 versus an X-axis of the range rates 18. The controller circuit 26 may utilize all of the range rates 18 detected within the search area 32, or the controller circuit 26 may limit the range rates 18 to a maximum value to reduce computational times. The range rates 18 in excess of 10 m/s may be excluded from the first histogram 34, as this level of range rate 18 is far above that which would indicate the trailer 14 being towed by the host vehicle 12, that is expected to have range rates 18 near zero. According to the non-limiting example depicted in FIG. 4, the system 10 only includes the detected range rates 18 less than 1.0 m/s.

The first histogram 34 further includes a plurality of equal segments 38 (i.e., bins, divisions, groups, etc.) of the counts of occurrences 36 of the range rates 18. That is, the controller circuit 26 divides the detected range rates 18 into an equal number of groups of the range rates 18, then counts a number of detections associated with each group of the range rates 18. A number of the plurality of equal segments 38 may be user defined, and may, in some examples, include 100 equal segments 38. That is, according to this example, detected range rates 18 up to 10 m/s are divided into 100 equal segments 38. The 100 equal segments 38 provides sufficient resolution between the detected targets having differing range rates 18, while reducing computational demands of the controller circuit 26 and memory 30 utilization.

The controller circuit 26 further determines a median value 40 of the range rates 18 for each of the plurality of equal segments 38. The median value 40 is the range rate 18 value lying at a midpoint of the detected range rates 18 in a particular equal segment 38. The controller circuit 26 further determines a mean value 42 of the range rates 18 based on the median value 40 and the respective counts of occurrences 36 in each of the plurality of equal segments 38. The mean value 42 is calculated by the controller circuit 26 by summing a product of the median values 40 and the respective counts of occurrences 36 for each equal segment 38, then dividing the sum by the total number of equal segments 38 (i.e., dividing by 100). It will be appreciated that other mathematical calculations of the mean value 42 may be used. The mean value 42 of the range rates 18 is stored in the memory 30 for later use by the controller circuit 26, as will be explained in more detail below.

Figures 5A, 5B:
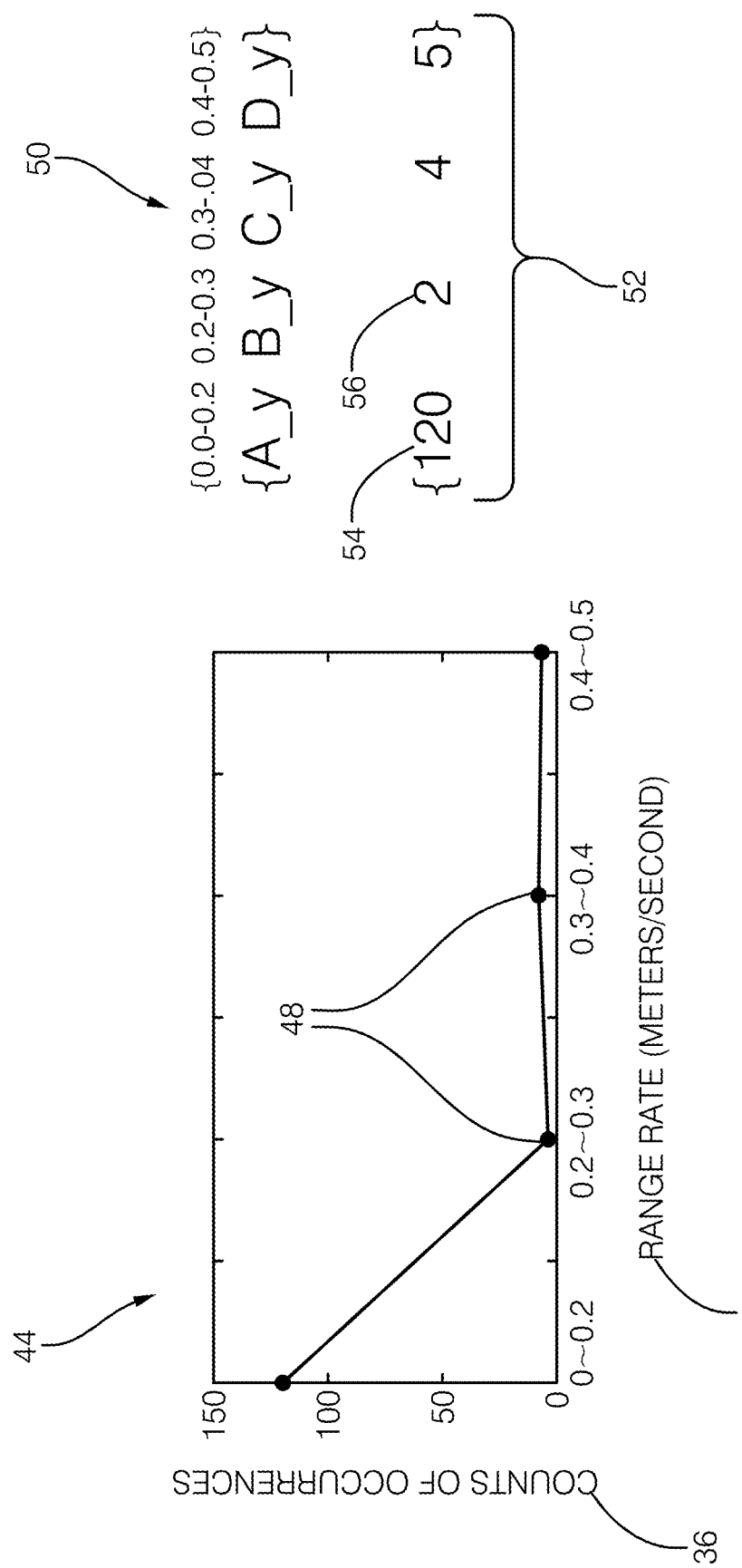
FIG. 5A is an illustration of a second histogram in accordance with one embodiment.
FIG. 5B is an array based on the second histogram of FIG. 5A in accordance with one embodiment.

The controller circuit 26 is further configured to determine a second histogram 44 comprising the counts of occurrences 36 of a portion 46 of the range rates 18 detected within the search area 32, as illustrated in FIG. 5A. The portion 46 of the range rates 18 comprising the second histogram 44 may be any portion 46, and in the example illustrated in FIG. 5A, is less than about 0.5 m/s. The range rates 18 in excess of about 0.5 m/s may be excluded from the second histogram 44, as the portion 46 of less than about 0.5 m/s are most indicative of the range rates 18 associated with the trailer 14 being towed by the host vehicle 12 (i.e., near zero range rates 18). The second histogram 44 further comprises a plurality of segments 48 of the counts of occurrences 36 of the portion 46 of the range rates 18. The plurality of segments 48 may be any number of segments 48, and in the example illustrated in FIG. 5 the plurality of segments 48 comprises four segments 48 with ranges of:

First segment: 0.0 m/s to 0.2 m/s
Second segment: 0.2 m/s to 0.3 m/s
Third segment: 0.3 m/s to 0.4 m/s
Fourth segment: 0.4 m/s to 0.5 m/s FIG. 5B illustrates an array 50 determined by the controller circuit 26 having a plurality of elements 52 corresponding to the plurality of segments 48 of the second histogram 44. That is, a first element 54 corresponds to the first segment, a second element 56 corresponds to the second segment, etc. Each of the plurality of elements 52 contains the count of the number of detections associated with the ranges of the four segments 48 as described above. That is, the plurality of elements 52 comprises four elements 52 (e.g., $\{A\_y \ B\_y \ C\_y \ D\_y\} = \{120 \ 2 \ 4 \ 5\}$), where the first element 54 is denoted as $A\_y$ with a corresponding value of 120 counts.

The controller circuit 26 further processes the array 50 by normalizing a minimum value in the array 50 to 1.0 in order to determine a relative contribution 58 of both the first element 54 and the second element 56. For example, the array 50 shown in FIG. 5B with the minimum value of 2.0 is normalized to:

$$\{120-2+1 \ 2-2+1 \ 4-2+1 \ 5-2+1\} = \{119 \ 1 \ 3 \ 4\}$$

The controller circuit 26 further determines the relative contribution 58 of both the first element 54 and the second element 56 of the normalized array 50 relative to the plurality of elements 52 of the array 50. That is, the controller circuit 26 calculates a percent contribution of both the first element 54 and the second element 56 (both of which are closer to zero range rate 18 relative to other elements 52 of the array 50) to the total of all the elements 52 combined, as shown below:

relative contribution=(119+1)/(119+1+3+4)=0.94

In other words, the detections contained in the first element 54 and the second element 56 (range rates 18 of 0.0 m/s to 0.3 m/s) contribute to 94 percent of the total detections in the array 50. The relative contribution 58 is also stored in the memory 30 to determine the trailer presence as will be describe below.

Figure 6:
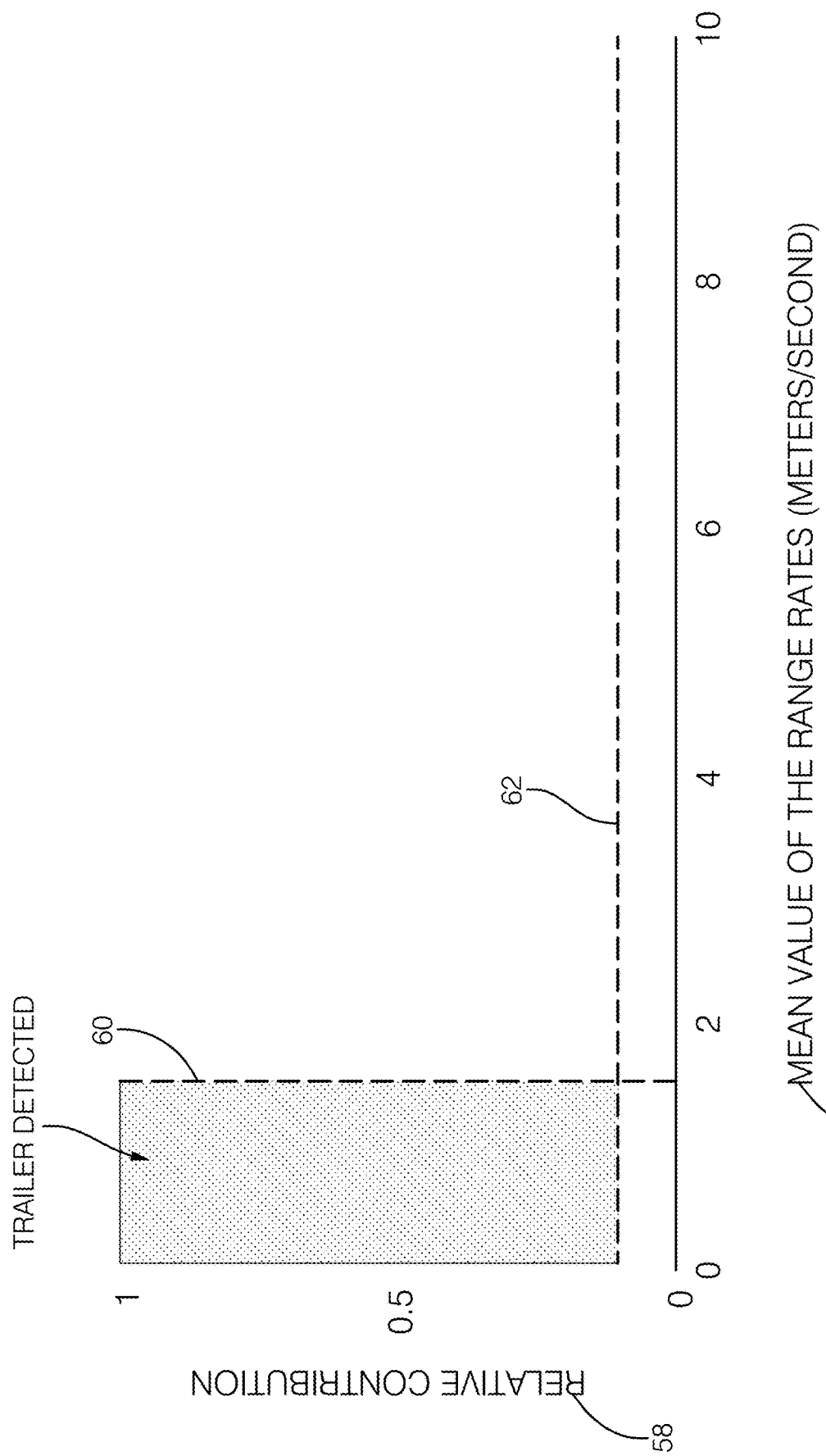
FIG. 6 is a plot of a relative contribution versus a mean value of the range rates accordance with one embodiment.
Figure 8:
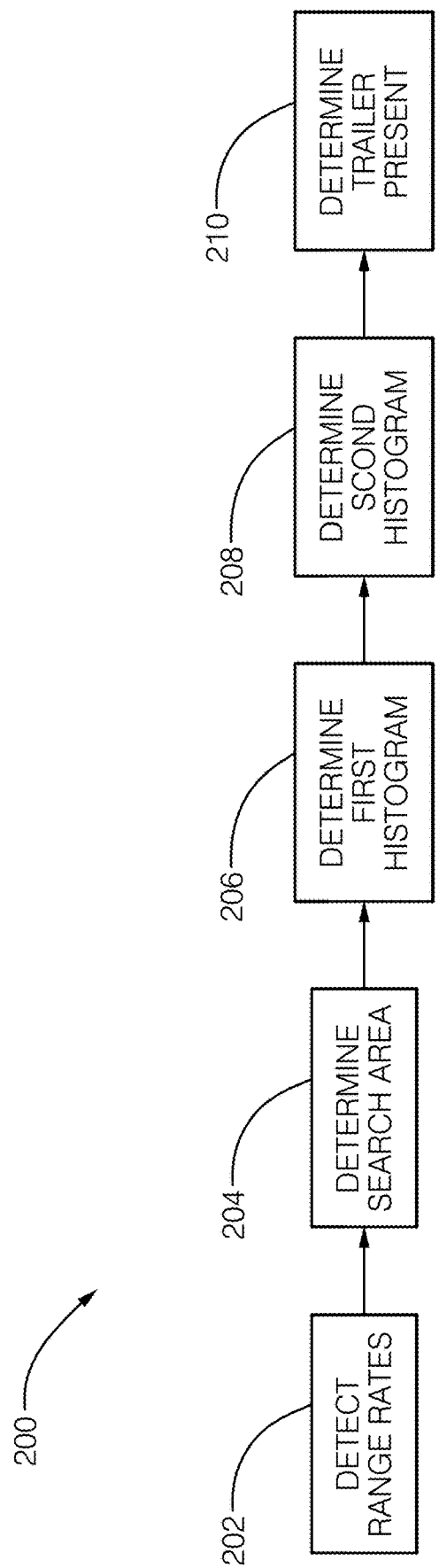
FIG. 8 is an illustration of a detection method in accordance with another embodiment.

FIG. 6 is a plot of the relative contribution 58 (Y-axis) versus the mean value 42 of the range rates 18 (X-axis). The controller circuit 26 further determines that the trailer 14 is being towed by the host vehicle 12 based on the first histogram 34 and the second histogram 44 when both the mean value 42 of the range rates 18 is less than a first threshold 60, and when the relative contribution 58 of both the first element 54 and the second element 56 of the array 50 is greater than a second threshold 62. The first threshold 60 and the second threshold 62 may be user defined. The inventors have discovered that the first threshold 60 of about 1.5 m/s, and the second threshold 62 of about 0.1 provide a sufficient balance between accuracy of trailer 14 detection and computational time.

FIGS. 7A-7C illustrate three scenarios (denoted as PA, PB, and PC) where the system 10 determines the trailer presence. In FIGS. 7A and 7B, the trailer 14 is being towed by the host vehicle 12 (PA and PB), and in FIG. 7C no trailer 14 is being towed by the host vehicle 12 (PC). The first histogram 34, second histogram 44, mean value 42 of the range rates 18, and the relative contribution 58 are indicated for each of the three scenarios. FIG. 7D is a plot of the relative contribution 58 versus the mean value 42 of the range rates 18 for the three scenarios PA, PB, and PC. The plot shows that PA and PB have coordinates on the plot that are both less than the first threshold 60 and greater than the second threshold 62 (i.e. trailer 14 detected), whereas PC has coordinates on the plot that are greater than the first threshold 60 and greater than the second threshold 62 (i.e. no trailer 14 detected).

FIG. 7 is a flow chart illustrating another embodiment of a detection method 200.

Step 202, DETECT RANGE RATES, includes detecting range rates 18 of objects 20 proximate a host vehicle 12 with a ranging sensor 16, as described above.

Step 204, DETERMINE SEARCH AREA, includes determining a search area 32 extending from the host vehicle 12, with a controller circuit 26 in communication with the ranging sensor 16, as described above. The search area 32 extends from the rear end of the host vehicle 12 along the host vehicle longitudinal axis 28 for a defined length and width, as described above.

Step 206, DETERMINE FIRST HISTOGRAM, includes determining, with the controller circuit 26, a first histogram 34 comprising counts of occurrences 36 of the range rates 18 detected within the search area 32, as described above. The first histogram 34 preferably comprises 100 equal segments 38 of the counts of occurrences 36 of the range rates 18, as described above. The controller circuit 26 processes the data from the first histogram 34 to determine a mean value 42 of the range rates 18, as described above.

Step 208, DETERMINE SECOND HISTOGRAM, includes determining, with the controller circuit 26, a second histogram 44 comprising the counts of occurrences 36 of a portion 46 of the range rates 18 detected within the search area 32, as described above. The portion 46 of the range rates 18 is preferably less than about 0.5 m/s. The controller circuit 26 processes the data from the second histogram 44 to determine the relative contribution 58 of the range rates 18 closest to zero, as described above.

Step 210, DETERMINE TRAILER PRESENCE, includes determining, with the controller circuit 26, that the trailer 14 is being towed by the host vehicle 12 based on the first histogram 34 and the second histogram 44, as described above. The controller circuit 26 determines that the trailer 14 is being towed by the host vehicle 12 when both the mean value 42 of the range rates 18 is less than the first threshold 60, and when the relative contribution 58 of both the first element 54 and the second element 56 of the array 50 is greater than a second threshold 62, as described above. The controller circuit 26 determines that the trailer 14 is being towed by the host vehicle 12 when host vehicle 12 is moving and the host vehicle 12 speed is less than about 0.5 m/s, and in a time of less than about 10 seconds.

Accordingly, a detection system 10 (the system 10), a controller circuit 26 for the system 10, and a detection method 200 are provided. The system 10 is an improvement over other detection systems because the system 10 determines that the trailer 14 is being towed by the host vehicle 12 when host vehicle 12 is moving and the host vehicle 12 speed is less than 0.5 m/s, and in a time of less than 10 seconds.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A detection system comprising:
a controller circuit in communication with a ranging sensor, the controller circuit configured to:
   detect range rates of objects proximate to a host vehicle;
   determine a search area extending from the host vehicle;
   determine a first histogram comprising counts of occurrences of the range rates associated with the objects detected within the search area;
   determine a second histogram comprising the counts of occurrences of a portion of the range rates associated with the objects detected within the search area, the portion of the range rates are less than 0.5 m/s;
   determine an array having a plurality of elements corresponding to a plurality of segments of the counts of occurrences of the portion of the range rates in the second histogram, each of the plurality of elements containing a count of a number of detections;
   determine a relative contribution of both a first element and a second element of the array relative to the plurality of elements of the array; and
   determine that a trailer is being towed by the host vehicle based on the first histogram and the second histogram when both a mean value for each of the plurality of segments is less than a first threshold and when the relative contribution of both the first element and the second element of the array is greater than a second threshold.

2. The detection system in accordance with claim 1, wherein the first histogram further comprises a plurality of equal segments of the counts of occurrences of the range rates.

3. The detection system in accordance with claim 2, wherein the controller circuit further determines the mean value for each of the plurality of segments based on a median value of the range rates for each of the plurality of equal segments and the respective counts of occurrences in each of the plurality of equal segments.

4. The detection system in accordance with claim 1, wherein the controller circuit determines that the trailer is being towed when the host vehicle is moving and a host vehicle speed is less than 0.5 m/s.

5. The detection system in accordance with claim 1, wherein the controller circuit determines that the trailer is being towed by the host vehicle in a time of less than 10 seconds.

6. A detection method comprising:
detecting range rates of objects proximate to a host vehicle;
determining a search area extending from the host vehicle, with a controller circuit in communication with a ranging sensor;
determining, with the controller circuit, a first histogram comprising counts of occurrences of the range rates associated with the objects detected within the search area;
determining, with the controller circuit, a second histogram comprising the counts of occurrences of a portion of the range rates associated with the objects detected within the search area, the portion of the range rates are less than 0.5 m/s;
determining an array having a plurality of elements corresponding to a plurality of segments of the counts of occurrences of the portion of the range rates in the second histogram, each of the plurality of elements containing a count of a number of detections;
determining a relative contribution of both a first element and a second element of the array relative to the plurality of elements of the array; and
determining, with the controller circuit, that a trailer is being towed by the host vehicle based on the first histogram and the second histogram when both a mean value for each of the plurality of segments is less than a first threshold and when the relative contribution of both the first element and the second element of the array is greater than a second threshold.

7. The detection method in accordance with claim 6, wherein the first histogram further comprises a plurality of equal segments of the counts of occurrences of the range rates.

8. The detection method in accordance with claim 7, the detection method further comprising determining the mean value for each of the plurality of segments based on a median value of the range rates for each of the plurality of equal segments and the respective counts of occurrences in each of the plurality of equal segments.

9. The detection method in accordance with claim 6, wherein the controller circuit determines that the trailer is being towed when the host vehicle is moving and a host vehicle speed is less than 0.5 m/s.

10. The detection method in accordance with claim 6, wherein the controller circuit determines that the trailer is being towed by the host vehicle in a time of less than 10 seconds.

11. A non-transitory computer-readable medium that stores instructions configured to cause a computing device to:
detect range rates of objects proximate to a host vehicle;
determine a search area extending from the host vehicle with a controller circuit in communication with a ranging sensor;
determine, with the controller circuit, a first histogram comprising counts of occurrences of the range rates associated with the objects detected within the search area;
determine, with the controller circuit, a second histogram comprising the counts of occurrences of a portion of the range rates associated with the objects detected within the search area, the portion of the range rates are less than 0.5 m/s;
determine an array having a plurality of elements corresponding to a plurality of segments of the counts of occurrences of the portion of the range rates in the second histogram, each of the plurality of elements containing a count of a number of detections;
determine a relative contribution of both a first element and a second element of the array relative to the plurality of elements of the array; and
determine, with the controller circuit, that a trailer is being towed by the host vehicle based on the first histogram and the second histogram when both a mean value for each of the plurality of segments is less than a first threshold and when the relative contribution of both the first element and the second element of the array is greater than a second threshold.

\* \* \* \* \*